3,227,737
PRODUCTION OF CARBOXYLIC ACIDS FROM THE RESIDUE OF CARBONYLIZATION PROCESS
Philip James Ashworth, Norton-on-Tees, England, assignor to Imperial Chemical Industries Limited, London, England, a corporation of Great Britain
No Drawing. Filed Dec. 9, 1960, Ser. No. 74,770
Claims priority, application Great Britain, Dec. 31, 1959, 44,393/59
3 Claims. (Cl. 260—413)

This invention relates to the production of carboxylic acids.

It is well known to synthesise oxygen-containing compounds by reacting olefins with carbon monoxide and hydrogen in the presence of a catalyst comprising cobalt. The product, which consists largely of aldehydes, is then hydrogenated, whereby a mixture consisting largely of primary alcohols is obtained. This mixture is normally subjected to separation by distillation. The residue from this distillation comprises high-boiling alcohols and ethers and, in general, other oxygenated compounds and hydrocarbons. The treatment of this residue from a so-called carbonylation process to yield valuable organic compounds has been the subject of intensive and widespread research.

One proposed method of treatment is to heat the alcohol-containing residue with caustic soda whereby the alcohol undergoes dehydrogenation and a soap of the carboxylic acid containing the same number of carbon atoms as the alcohol is formed. This reaction may be expressed by the equation:

$$R \cdot CH_2OH + NaOH \rightarrow R \cdot COONa + 2H_2$$

For example, in one method of carrying out the reaction, the alcohol-containing residue is heated at about 260° C. with a quantity of solid caustic soda which is a 10% by weight excess on the amount theoretically required to convert the alcohols into soaps of the corresponding acids. The pressure at which this reaction is carried out should be sufficiently high to retain the organic reactants in the liquid phase.

The products of this reaction include in general a mixture of soaps, some of which are derived from carboxylic acids containing ten carbon atoms or less and some of which are derived from carboxylic acids containing more than ten carbon atoms. It is desirable to be able to liberate the free acids and to separate them from each other. The liberation is normally accomplished by the addition of mineral acid, but this has the disadvantage that a mixture containing all the carboxylic acids is produced and this is difficult to separate into its constituents.

According to the present invention, there is now provided a process for the production of carboxylic acids from the alcohol-containing residue of a carbonylation process which comprises the steps of heating the said residue with a caustic alkali, thereafter contacting the products so obtained with water to give aqueous and non-aqueous layers, treating the aqueous layer with carbon dioxide and removing the free carboxylic acids liberated.

The treatment of the residue from the carbonylation process is preferably carried out using sodium hydroxide as the caustic alkali. Preferably an excess, for example 10% by weight, of caustic alkali over that theoretically required is employed and the reaction temperature is suitably 260° to 350° C. On adding the product to water, there is a ready separation between insoluble materials such as ethers and hydrocarbons on the one hand and water-soluble soaps on the other. The aqueous layer is separated, washed if this is considered desirable with a light petrol fraction to remove neutral oil, and treated with carbon dioxide. This treatment may be effected at atmospheric temperature and presure or at any suitable elevated temperature and pressure. By operating in this manner, free carboxylic acids containing more than 10 carbon atoms are produced. These frequently contain occluded soaps of acids having ten carbon atoms or less in the molecule, which may be removed by thorough washing with water.

It is a particularly advantageous feature of the present invention that the liquid remaining after the carbon dioxide treatment, together if desired with the aqueous washings of the carboxylic acids having more than ten carbon atoms in the molecule, may be acidified with a mineral acid, for example sulphuric acid or hydrochloric acid. This treatment liberates carboxylic acids containing ten carbon atoms or less. It will be understood, of course, that carboxylic acids containing ten carbon atoms or less may be liberated from the aqueous washings by acidification with a mineral acid, without bulking these aqueous washings with the liquid remaining after the carbon dioxide treatment.

By using the overall process described above, the acids liberated from the soaps produced by treating the residue from a carbonylation process are automatically divided into two fractions, namely those containing at most ten carbon atoms and those containing more than ten carbon atoms. For instance, $C_7$ olefins may be carbonylated to give the mixture of branched chain alcohols known as iso-octanol. The residue may be treated by the process of the present invention to give, as separate products, mixtures of $C_8$ and $C_{16}$ carboxylic acids. Similarly, the residue obtained in the production of the mixture of branched chain alcohols known as nonanol may be converted into separate products, one comprising $C_9$ carboxylic acids and the other $C_{18}$ carboxylic acids. Again, the residue obtained in a process for the production of mixed branched chain primary alcohols containing 7 to 9 carbon atoms may be treated by the process of the present invention. In this way, there are obtained as separate products mixtures of $C_7$–$C_9$ carboxylic acids and mixtures of $C_{14}$–$C_{18}$ carboxylic acids.

*Example 1*

The starting material employed in this Example was the residue obtained in a process for the production of the mixture of branched chain alcohols known as iso-octanol. The residue, of which 721 grams were employed, had an OH value of 98 mgm. KOH per gram. This residue was heated with caustic soda (60 grams) to 260° C. for 4 hours in a 1 litre flask equipped with a temperature point, a stirrer and a reflux condenser system. During the course of this reaction 13.8 grams of a light distillate were removed. To the product, 1,700 ml. of water were added and, after vigorous stirring, the mixture was allowed to stand and the aqueous phase was then removed. In this way, there were obtained 2025 ml. of the aqueous phase and 344 grams of neutral oil. Washing of the aqueous phase with light hydrocarbon removed a further 21.5 grams of neutral oil. The aqueous solution was then transferred to a baffled walled flask equipped with a temperature point, a gas outlet point and a cruciform stirrer through which carbon dioxide was passed at a rate of 20 liters per hour. After this treatment with carbon dioxide had been continued for 30 minutes, the outlet gas rate indicated that reaction was complete. The crude $C_{16}$ acid liberated was separated and washed with water to remove occluded sodium salts of $C_8$ carboxylic acids. In this way, 175 grams of $C_{16}$ acid were obtained, this having an acid value of 195 mgm. KOH per gram. This mixture on distillation gave 166 grams of $C_{16}$ acid having an acid value of 220 mgm. KOH per gram.

The water which had been used for washing the crude $C_{16}$ acid was treated with mineral acid, whereby 56.3 grams of crude $C_8$ acid were obtained, this product having an acid value of 326 mgm. KOH per gram. Also, the aqueous layer remaining after the carbon dioxide treatment was acidified with sulphuric acid and yielded 72.8 grams of $C_8$ acid, this product having an acid value of 374 mgm. KOH per gram. These crude mixtures of $C_8$ acid were bulked and distilled to give 113 grams of $C_8$ acid having an acid value of 385 mgm. KOH per gram.

*Example 2*

The starting material employed in this example was the residue obtained in a process for the production of the mixture of branched chain alcohols known as nonanol. The residue, of which 836 grams were employed, had an OH value of 85 mgm. KOH per gram. This residue was heated with caustic soda (60 grams) as described in Example 1. During the course of the reaction, 91.6 grams of a light distillate were removed. To the product, 1700 ml. of water were added and, after vigorous stirring, the mixture was allowed to stand and the aqueous phase was then removed. In this way, there were obtained 2010 ml. of the aqueous phase and 425 grams of neutral oil. The aqueous phase was transferred to a baffled walled flask and treated with carbon dioxide as described in Example 1. The crude $C_{18}$ acid liberated was separated and washed with water to remove occluded sodium salts of $C_9$ carboxylic acid. The residual product, which weighed 140 gms., consisted of 14% by weight of neutral oil, the remainder being $C_{18}$ acid. The acid value of this product was 166 mgm. KOH per gram.

The water washings used to remove occluded sodium salts of $C_9$ carboxylic acid were bulked with the liquid remaining after the carbon dioxide treatment. To this liquid, sulphuric acid was added. 108 grams of acidic product were libearted. This contained 4% by weight of neutral oil but otherwise consisted almost entirely of $C_9$ acid, the acid value of the product being 538 mgm. KOH per gram.

*Example 3*

The starting material employed in this Example was the residue obtained in a process for the production of mixtures of branched chain primary alcohols containing seven to nine carbon atoms. The residue, of which 835 grams were employed, had an OH value of 118 mgm. KOH per gram. This residue was heated with caustic soda (80 grams) under the conditions described in Example 1. During the course of this reaction, 37.6 grams of a light distillate were removed. To the product, 1700 ml. of water were added and, after vigorous stirring, the mixture was allowed to stand and the aqueous phase was then removed. In this way, there were obtained 2110 ml. of the aqueous phase and 346 grams of neutral oil. Washing of the aqueous phase with light hydrocarbon removed a further 77 grams of neutral oil. The aqeuous solution was then transferred to a baffled walled flask and treated with carbon dioxide as described in Example 1. Crude $C_{14}$–$C_{18}$ acid liberated was separated and washed with water to remove occluded sodium salts of $C_7$–$C_9$ carboxylic acids. In this way 239 grams of $C_{14}$–$C_{18}$ acid were obtained, this having an acid value of 219 mgm. KOH per gram and containing 0.57% by weight of neutral oil.

The water which had been used for washing the crude $C_{14}$–$C_{18}$ acid was treated with mineral acid, whereby 28.3 grams of crude $C_7$–$C_9$ acid were obtained, this product having an acid value of 340 mgm. KOH per gram and containing 0.97% by weight of neutral oil. Also, the aqueous layer remaining after the carbon dioxide treatment was acidified with mineral acid and yielded 35.2 grams of $C_7$–$C_9$ acid, this product having an acid value of 351 mgm. KOH per gram and containing 0.29% by weight of neutral oil.

I claim:

1. A process for the production of carboxylic acids from the alcohol-containing residue obtained by carbonylizing an olefin containing 7 to 9 carbon atoms, hydrogenating and distilling the product, said process comprising the steps of heating said residue with a caustic alkali at a temperature of 260 to 350° C. thereafter contacting the products so obtained with water to give aqueous and non-aqueous layers, treating the aqueous layer with carbon dioxide, and removing the free carboxylic acid liberated which contains twice the number of carbon atoms as the olefin carbonylized, and acidifying the aqueous layer remaining after said carbon dioxide treatemnt with a mineral acid selected from the group consisting of sulphuric acid and hydrochloric acid, to liberate carboxylic acid having the same number of carbon atoms as said olefin carbonylized.

2. A process as claimed in claim 1 in which the caustic alkali is sodium hydroxide.

3. A process for the production of carboxylic acids from the alcohol-containing residue obtained by carbonylizing an olefin containing 7 to 9 carbon atoms, hydrogenating and distilling the product of said process comprising the steps of heating said residue with a caustic alkali at a temperature of 260 to 350° C., thereafter contacting the product so obtained with water to give aqueous and non-aqueous layers, treating the aqueous layer with carbon dioxide, removing the free carboxylic acid thus liberated, said carboxylic acid containing twice the number of carbon atoms as the olefin carbonylized, washing this acid with water to remove occluded soaps of said acid, adding the wash liquor so obtained to the liquid remaining after the carbon dioxide treatment, and acidifying this bulked liquid with a mineral acid selected from the group consisting of sulfuric acid and hydrochloric acid to liberate carboxylic acid having the same number of carbon atoms as the olefin carbonylized.

References Cited by the Examiner

UNITED STATES PATENTS

| | | | |
|---|---|---|---|
| 2,196,581 | 4/1940 | Stephenson et al. | 260—531 |
| 2,232,331 | 2/1941 | Geithe et al. | 260—419 |
| 2,766,267 | 10/1956 | Hill | 260—413 |
| 2,871,249 | 1/1959 | Buchner et al. | 260—413 |

OTHER REFERENCES

Fieser et al., "Organic Chemistry," 2nd ed., pp. 161–3 (1950).

Horning, Organic Syntheses, collective volume III, p. 34 (1955).

Markley, Fatty Acids, page 180 (1947).

Weissberger, Technique of Org. Chem., vol. III, page 481 (1950).

CHARLES B. PARKER, *Primary Examiner.*

LEON ZITVER, *Examiner.*

GREGORY P. D'ANGELO, ANTON H. SUTTO,
*Assistant Examiners.*